United States Patent
Endou et al.

(10) Patent No.: US 10,923,296 B2
(45) Date of Patent: Feb. 16, 2021

(54) METHOD FOR MANUFACTURING POSITIVE ELECTRODE INCLUDING CONDUCTIVE POLYMER LAYER SELECTIVELY FORMED ON SURFACE OF CARBON LAYER DISPOSED ON CURRENT COLLECTOR FOR POWER STORAGE DEVICE, AND METHOD FOR MANUFACTURING POWER STORAGE DEVICE

(71) Applicant: Panasonic Intellectual Property Management Co., Ltd., Osaka (JP)

(72) Inventors: Tougo Endou, Osaka (JP); Yasuyuki Ito, Osaka (JP); Susumu Nomoto, Kyoto (JP); Nao Matsumura, Osaka (JP); Hiroki Hayashi, Kyoto (JP); Makoto Akutsu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 131 days.

(21) Appl. No.: 16/115,568

(22) Filed: Aug. 29, 2018

(65) Prior Publication Data

US 2018/0374661 A1 Dec. 27, 2018

Related U.S. Application Data

(63) Continuation of application No. PCT/JP2017/006263, filed on Feb. 21, 2017.

(30) Foreign Application Priority Data

Mar. 10, 2016 (JP) .................................. 2016-047645

(51) Int. Cl.
*H01G 11/86* (2013.01)
*H01M 2/26* (2006.01)
(Continued)

(52) U.S. Cl.
CPC .............. *H01G 11/86* (2013.01); *H01M 2/26* (2013.01); *H01M 4/1399* (2013.01); *H01M 4/66* (2013.01);
(Continued)

(58) Field of Classification Search
CPC ........ H01M 2/26; H01M 4/1399; H01M 4/66; H01M 4/661; H01M 4/663; H01M 10/0585; H01M 10/0587; H01G 11/86
(Continued)

(56) References Cited

U.S. PATENT DOCUMENTS

| 5,047,302 A | 9/1991 | Bittihn et al. |
| 2014/0220438 A1 | 8/2014 | Abe et al. |

FOREIGN PATENT DOCUMENTS

| JP | 61-133557 | 6/1986 |
| JP | 08316103 A | * 11/1996 |

(Continued)

OTHER PUBLICATIONS

International Search Report of PCT application No. PCT/JP2017/006263 dated May 23, 2017.
(Continued)

*Primary Examiner* — Sean P Cullen
(74) *Attorney, Agent, or Firm* — McDermott Will and Emery LLP

(57) ABSTRACT

A method for manufacturing a positive electrode for a power storage device includes the steps of: preparing a current collector that includes a first region and a second region on a surface of the current collector, the first region having a carbon layer formed on the surface, the second region having the surface exposed; and forming a conductive polymer layer selectively on a surface of the carbon layer by immersing the current collector in an electrolytic solution (Continued)

containing a raw material monomer and then conducting electrolytic polymerization of the raw material monomer.

20 Claims, 3 Drawing Sheets

(51) Int. Cl.
  *H01M 4/1399* (2010.01)
  *H01M 10/0585* (2010.01)
  *H01M 10/0587* (2010.01)
  *H01M 4/66* (2006.01)
  *H01M 4/02* (2006.01)

(52) U.S. Cl.
  CPC ........... *H01M 4/661* (2013.01); *H01M 4/663* (2013.01); *H01M 10/0585* (2013.01); *H01M 10/0587* (2013.01); *H01M 2004/028* (2013.01)

(58) Field of Classification Search
  USPC ........................................................ 29/623.5
  See application file for complete search history.

(56) References Cited

FOREIGN PATENT DOCUMENTS

| | | | |
|---|---|---|---|
| JP | 2000-133250 | | 5/2000 |
| JP | 2005158882 | A * | 6/2005 |
| JP | 2009-231421 | | 10/2009 |
| JP | 2012-226961 | | 11/2012 |
| JP | 2013-232388 | | 11/2013 |
| WO | 2015/153989 | A1 | 10/2015 |

OTHER PUBLICATIONS

English Translation of Chinese Search Report dated Sep. 3, 2020 for the related Chinese Patent Application No. 201780015433.6.

* cited by examiner

METHOD FOR MANUFACTURING POSITIVE ELECTRODE INCLUDING CONDUCTIVE POLYMER LAYER SELECTIVELY FORMED ON SURFACE OF CARBON LAYER DISPOSED ON CURRENT COLLECTOR FOR POWER STORAGE DEVICE, AND METHOD FOR MANUFACTURING POWER STORAGE DEVICE

RELATED APPLICATIONS

This application is a continuation of the PCT International Application No. PCT/JP2017/006263 filed on Feb. 21, 2017, which claims the benefit of foreign priority of Japanese patent application No. 2016-047645 filed on Mar. 10, 2016, the contents all of which are incorporated herein by reference.

TECHNICAL FIELD

The present disclosure relates to a method for manufacturing a positive electrode for a power storage device that contains a conductive polymer, and a method for manufacturing a power storage device.

BACKGROUND

In recent years, a power storage device having property intermediate between a lithium ion secondary battery and an electric double layer capacitor attracts attention, and for example, use of a conductive polymer as a positive electrode material is considered (see Unexamined Japanese Patent Publication No. 2012-226961 and Unexamined Japanese Patent Publication No. 2013-232388). As the conductive polymer, polyaniline and polypyrrole are known, for example. Since a positive electrode containing a conductive polymer allows the Faraday reaction to proceed in association with adsorption (doping) and desorption (dedoping) of an anion, the positive electrode has small reaction resistance and has higher output than output of a positive electrode of a general lithium ion secondary battery.

Unexamined Japanese Patent Publication No. 2013-232388 proposes use of a positive electrode including a sheet-shaped positive current collector, a carbon layer formed on an entire surface of the positive current collector, and a conductive polymer layer formed on a surface of the carbon layer that is opposite from a surface of the carbon layer in contact with the current collector.

In the meantime, for a purpose of, for example, attaching a lead member to the positive current collector, a process for scraping, for example, with a brush, the carbon layer and the conductive polymer layer from the positive electrode is performed in order to expose part of the surface of the positive current collector.

SUMMARY

The process for exposing part of the surface of the positive current collector, however, is likely to damage an exposed surface of the positive current collector or damage the carbon layer and the conductive polymer layer.

The present disclosure provides a method for manufacturing a positive electrode for a power storage device that is capable of easily exposing part of a surface of a positive current collector, without processing of scraping part of a conductive polymer layer and a carbon layer from a positive electrode.

In view of the forgoing circumstances, one aspect of the present disclosure relates to a method for manufacturing a positive electrode for a power storage device, the method including the steps of: preparing a current collector that includes a first region and a second region on a surface of the current collector, the first region having a carbon layer formed on the surface, the second region having the surface exposed; and forming a conductive polymer layer selectively on a surface of the carbon layer by immersing the current collector in an electrolytic solution containing a raw material monomer and then conducting electrolytic polymerization of the raw material monomer.

Another aspect of the present disclosure relates to a method for manufacturing a power storage device, the method including the steps of: manufacturing a positive electrode by the above method for manufacturing a positive electrode for a power storage device; and stacking or winding the positive electrode, a negative electrode, and a separator, the separator being interposed between the positive electrode and the negative electrode.

The method for manufacturing a positive electrode for a power storage device according to the present disclosure enables part of a surface of a positive current collector to be easily exposed, without a process of scraping part of a conductive polymer layer and a carbon layer from a positive electrode. Accordingly, the positive electrode is less likely to be damaged, so that it is easy to attach a lead member to the positive electrode.

DESCRIPTION OF EMBODIMENTS

Figure 1:
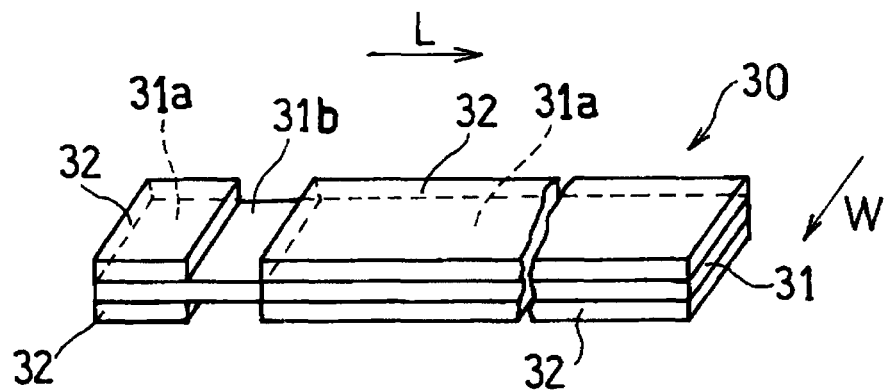
FIG. 1 is a perspective view illustrating first intermediate body 30 obtained by a step (1a) of a method for manufacturing a positive electrode for a power storage device according to a first exemplary embodiment of the present disclosure.

[Method for Manufacturing Positive Electrode for Power Storage Device]

A method for manufacturing a positive electrode for a power storage device according to the present disclosure includes a step (step (1)) of preparing, as a first intermediate body, a positive current collector that has a carbon layer formed on part of a surface of the positive current collector. Here the first intermediate body, a first region on the surface of the positive current collector represent a region that has the carbon layer formed, and a second region on the surface of the positive current collector represent a region that has no carbon layer formed and has the surface of the positive current collector exposed. Further, the present method further includes a step (step (2)) of forming a positive electrode (second intermediate body) by immersing the first intermediate body in an electrolytic solution containing a raw material monomer and then conducting electrolytic polymerization of the raw material monomer to form a conductive polymer layer selectively on a surface (a surface opposite to a surface in contact with the positive current collector) of the carbon layer.

In the step (2), a conductive polymer is hardly formed on the second region having the positive current collector exposed, and a conductive polymer is easily formed on the surface (the surface opposite to the surface in contact with the positive current collector) of the carbon layer that has been formed on the first region of the positive current collector. Accordingly, the positive electrode that has the conductive polymer layer formed selectively on the first region can be produced.

No conductive polymer layer is formed on the second region of the positive current collector on which no carbon layer is formed, so that it is possible to easily attach a lead member to the second region without a process of scraping the carbon layer and the conductive polymer layer. Hence, damage to the positive electrode generated by the process of scraping can be prevented. This results in an increase of reliability in the positive electrode.

It is not clear why the conductive polymer is hardly formed on the second region of the positive current collector and the conductive polymer layer is formed selectively on the surface of the carbon layer in the step (2). There is a possibility that a difficulty in progress of a polymerization reaction on the second region attributes to existence of an oxide film on the second region of the positive current collector, but the existence of the oxide film is not as high a level as affecting contact resistance between a lead member and a current collector described later.

As the positive current collector, a sheet-shaped current collector is used, for example. Examples of the sheet-shaped current collector include a metal foil, a metal porous body, a punched metal, and an expanded metal. As a material for the positive current collector, aluminum, an aluminum alloy, nickel, and titanium, for example, may be used, and preferably aluminum and an aluminum alloy are used. The sheet-shaped current collector has a thickness ranging from 10 µm to 100 µm, inclusive, for example.

The first region and the second region may exist on both front surface and back surface of the sheet-shaped current collector or on one of the front surface and the back surface of the sheet-shaped current collector.

The step (1) includes, for example, masking a region to be the second region on the surface of the positive current collector, then applying a carbon paste to the entire surface of the positive current collector to form a coating film, and subsequently drying the coating film to form the carbon layer. As a technique of masking, a publicly known technique may be used. Alternatively, a carbon paste may be applied intermittently on the surface of the positive current collector to form a coating film. In this case, the second region is a region to which the carbon paste has not been applied. The carbon paste is produced by, for example, dispersing carbon black and a resin component in water or in an organic solvent. The carbon layer has a thickness ranging from 1 µm to 20 µm, inclusive, for example.

As the raw material monomer used in the step (2), any polymerizable compound that is capable of generating a conductive polymer described later by oxidation in electropolymerization may be used. The raw material monomer may include an oligomer. As the raw material monomer, aniline, pyrrole, thiophene, furan, thiophene vinylene, pyridine, and derivatives of these monomers, for example, may be used. These raw material monomers may be used alone or in combination of two or more of these raw material monomers.

The raw material monomer is preferably aniline that allows the conductive polymer layer to be easily formed selectively on the surface of the carbon layer. In this case, a layer containing polyaniline is formed as the conductive polymer layer.

The step (2) is performed by, for example, immersing the first intermediate body and an opposite electrode in an electrolytic solution containing an anion (dopant) and then flowing current between the first intermediate body and the opposite electrode, with the first intermediate body set as an anode. In this process, a film of a conductive polymer doped with the anion is formed selectively on the surface of the carbon layer of the first intermediate body.

As the electrolytic solution, a publicly known material may be used, and, for example, a solution produced by dissolving an anion (dopant)-containing supporting electrolyte in a solvent may be used. As the solvent, water may be used, or a nonaqueous solvent may be used in consideration of solubility of a monomer. As the nonaqueous solvent, alcohols such as ethyl alcohol, methyl alcohol, isopropyl alcohol, ethylene glycol, and poloprene glycol may be preferably used. As the supporting electrolyte, a conjugated acid of an anion and an alkali metal salt containing an anion (sodium salt, potassium salt, etc.) may be used.

Examples of the anion include a sulfate ion, a nitrate ion, a phosphate ion, a borate ion, a benzenesulfonate ion, a naphthalenesulfonate ion, a toluenesulfonate ion, a methanesulfonate ion ($CF_3SO_3^-$), a perchlorate ion ($ClO_4^-$), a tetrafluoroborate ion ($BF_4^-$), a hexafluorophosphate ion ($PF_6^-$), a fluorosulfate ion ($FSO_3^-$), a bis(fluorosulfonyl)imide ion ($N(FSO_2)_2^-$), and a bis(trifluoromethanesulfonyl)imide ion ($N(CF_3SO_2)_2^-$). These anions may be used alone or in combination of two or more of these anions.

The anion may be a polymer ion. Examples of the polymer ion include ions of polyvinylsulfonic acid, polystyrenesulfonic polyallylsulfonic polyacrylsulfonic acid, polymethacrylsulfonic acid, poly(2-acrylamido-2-methylpropanesulfonic acid), polyisoprenesulfonic acid, and poly acrylic acid. These polymers may be a homopolymer or a copolymer of two or more monomers. These polymer ions may be used alone or in combination of two or more of these polymer ions.

The electrolytic solution used in the step (2) is preferably controlled to have a pH ranging from 0 to 4 and a temperature ranging from 0° C. to 45° C. Current density during the electropolymerization preferably ranges from 1 $mA/cm^2$ to 100 $mA/cm^2$, inclusive, which allows the conductive polymer layer to be certainly formed selectively on the surface of the carbon layer in a short time.

The electrolytic solution preferably has the raw material monomer dissolved at a rate ranging from 0.1 mol/L to 3 mol/L, inclusive. The electrolytic solution preferably has an anion concentration ranging from 0.1 mol/L to 5 mol/L, inclusive.

Thickness of the conductive polymer layer can be easily controlled by appropriately changing, for example, the current density in electrolysis or a polymerization period. The conductive polymer layer has a thickness ranging from 50 µm to 300 µm, inclusive, for example.

The conductive polymer formed by the electropolymerization is preferably a π-conjugated polymer, and a π-electron conjugated polymer exerts excellent conductivity by doping with an anion (dopant). Examples of the it-conjugated polymer that can be used include polypyrrole, polythiophene, polyfuran, polyaniline, polythiophene vinylene, polypyridine, and derivatives of these polymers. These n-conjugated polymers may be used alone or in combination of two or more of these π-conjugated polymers. A weight-average molecular weight of the conductive polymer is not particularly limited and ranges from 1000 to 100000, inclusive, for example.

Derivatives of polypyrrole, polythiophene, polyfuran, polyaniline, polythiophene vinylene, and polypyridine mean polymers having, as a basic skeleton, polypyrrole, polythiophene, polyfuran, polyaniline, polythiophene vinylene, and polypyridine, respectively. For example, a polythiophene derivative includes poly(3,4-ethylenedioxythiophene) (PEDOT) and the like.

First Exemplary Embodiment

In a first exemplary embodiment of the present disclosure, first intermediate body 30 shown in FIG. 1 is prepared (step 1a). First intermediate body 30 is formed of band-shaped (elongated) positive current collector 31. On both front surface and back surface, first intermediate body 30 has a region (first region 31a) that has carbon layer 32 formed and a region (second region 31b) that has no carbon layer formed and has positive current collector 31 exposed. Second region 31b is formed widthwise along (along direction W in FIG. 1) positive current collector 31. And first region 31a is divided into two regions by providing second region 31b in a predetermined region midway lengthwise along (along direction L in FIG. 1) the positive current collector.

Figure 2:
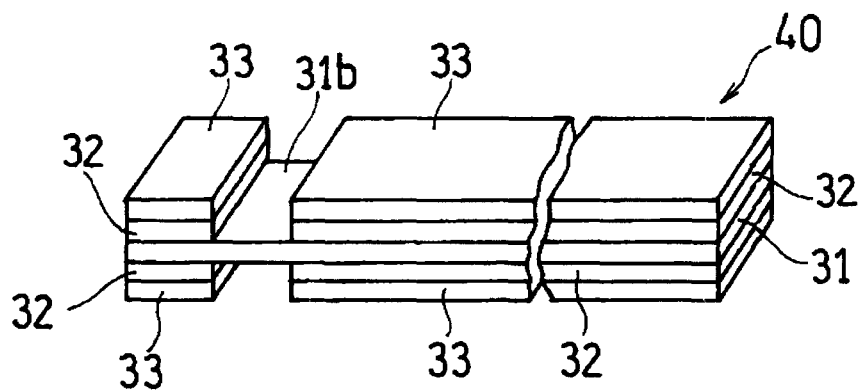
FIG. 2 is a perspective view illustrating second intermediate body 40 obtained by a step (2a) of the method for manufacturing a positive electrode for a power storage device according to the first exemplary embodiment of the present disclosure.

Next, first intermediate body 30 is immersed in an electrolytic solution containing a raw material monomer and the raw material monomer is electrolytically polymerized (step 2a). In this way, as shown in FIG. 2, second intermediate body 40 that includes conductive polymer layer 33 formed selectively on a surface of carbon layer 32 can be produced. In the step (2a), conductive polymer layer 33 is not formed on second region 31b not covered with carbon layer 32 or is only slightly formed even if formed. Hence, a process of scraping, for example by using a brush, part of the carbon layer and the conductive polymer layer from the surface of the positive current collector is not needed.

Figure 3:
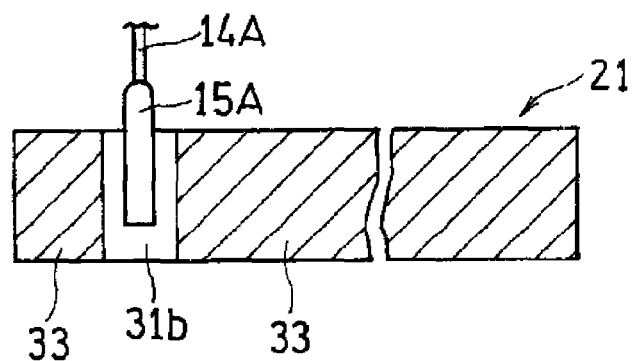
FIG. 3 is a top view illustrating a positive electrode that is obtained by a step (3a) of the method for manufacturing a positive electrode for a power storage device according to the first exemplary embodiment of the present disclosure and to which a lead member is attached.

Further, in the present exemplary embodiment, a lead member is attached to second region 31b of second intermediate body 40 as shown in FIG. 3 (step (3a)). In FIG. 3, hatched area indicates the region (first region 31a) having carbon layer 32 and conductive polymer layer 33 which are formed in this order. The lead member is formed of, for example, lead wire 14A and lead tab 15A. Lead tab 15A is, for example, welded to a surface of second region 31b to produce positive electrode 21 including the lead member.

Alternatively, lead tab 15A may be attached to second region 31b by following process. First, at least one protrusion is provided on a surface of lead tab 15A, and next a hole on second region 31b through which the protrusion is allowed to pass is provided. Lastly, the protrusion is allowed to pass through the hole from one surface of second region 31b, and then a tip of the protrusion is crushed to lock the tip on the other surface of the second region. For example, lead tab 15A and second region 31b are bored sequentially so as to penetrate the lead tab and the second region, and a burr formed on lead tab 15A in the boring may be utilized as the protrusion. The burr passes through a hole formed on second region 31b by the boring, and therefore, a tip of the burr may be crushed and swaged to the surface of second region 31b.

In the present exemplary embodiment, the first region and the second region have been provided on both surfaces of the positive current collector. The first region and the second region, however, may be provided on only one surface of the positive current collector or may be provided in different positions on the front and back surfaces. That is, a position and a size of the second region can be appropriately determined according to a size or a shape of a power storage device.

Second Exemplary Embodiment

Figure 4:
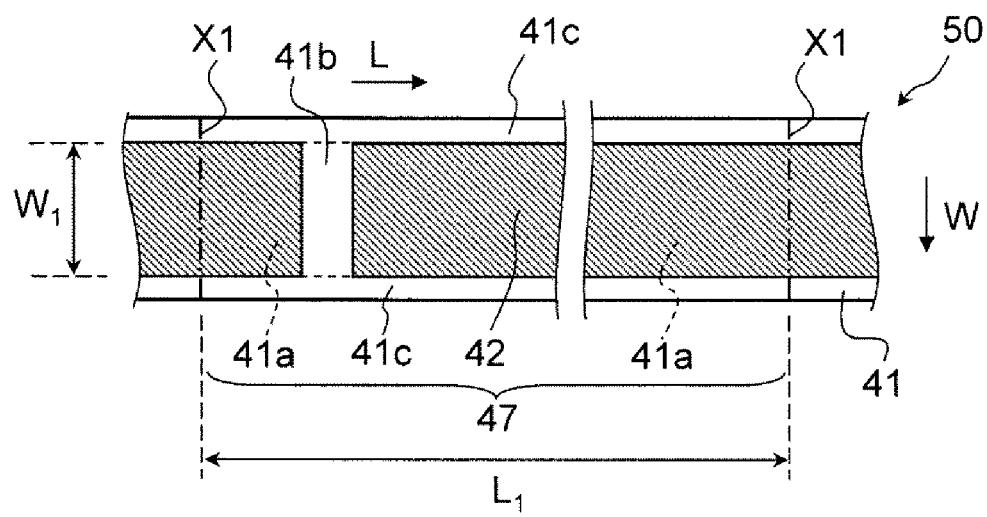
FIG. 4 is a top view illustrating first intermediate body 50 obtained by a method for manufacturing a positive electrode for a power storage device according to a second exemplary embodiment of the present disclosure.

In a second exemplary embodiment of the present disclosure, first intermediate body 50 shown in FIG. 4 is prepared (step 1b). In FIG. 4, hatched area indicates a region (first region 41a) having carbon layer 42 formed. First intermediate body 50 is different from first intermediate body 30 of the first exemplary embodiment in further including, in addition to second region 41b, second regions 41c having no carbon layer 42 formed on widthwise both ends (in direction W in FIG. 4). Second region 41c extends lengthwise along (along direction L in FIG. 4) band-shaped positive current collector 41. Further, in the present exemplary embodiment, unit region 47 having a same configuration as a configuration of first intermediate body 30 is repetitively formed along direction L. That is, positive current collector 41 has an elongated sheet shape that extends along direction L. Length $L_1$ in FIG. 4 represents a dimension along direction L of unit region 47. Length $W_1$ in FIG. 4 represents a dimension along direction W of first region 41a having carbon layer 42 formed. Unit region 47 corresponds to a positive electrode for the size of one power storage device.

The same electropolymerization step (step 2b) as in the first exemplary embodiment can be continuously performed on first intermediate body 50 to form a conductive polymer layer selectively on a surface of carbon layer 42 and thus give a second intermediate body.

In the present exemplary embodiment, positive current collector 41 that is elongated sheet-shaped can be conveyed by a roll to continuously produce first intermediate body 50 and the second intermediate body. Here, formation of second region 41c along direction L can give a region having no conductive polymer layer formed along direction L. When first intermediate body 50 or the second intermediate body is conveyed by a roll, it is possible to prevent the carbon layer or the conductive polymer layer from getting contact with the roll by making second region 41c brought into contact with the roll. This results in enabling a positive electrode having excellent reliability to be manufactured efficiently and continuously.

The present exemplary embodiment further includes a step (step (3b)) of cutting out a positive electrode per unit region 47 from the second intermediate body. Specifically, the second intermediate body is cut along cutting line X1 that is shown as a dot-and-dash line X1 in FIG. 4. Pair of cutting lines X1 represent both ends of unit region 47. This enables a plurality of positive electrodes to be easily produced from the second intermediate body. In this case, second region 41c may be cut away to give a positive electrode with width $W_1$.

In the same manner as in the first exemplary embodiment, a lead member can be attached, along direction W of positive current collector 41, to second region 41b having neither carbon layer 42 nor the conductive polymer layer formed. The attachment of the lead member can be performed before or after the cutting for the positive electrodes.

In the exemplary embodiment, carbon layer 42 and the conductive polymer layer have been formed in a region in the vicinity of dot-and-dash line X1 shown in FIG. 4. In the second intermediate body; however, the second region may further be provided at a region between adjacent unit regions 47 (the region in the vicinity of dot-and-dash line X1 shown in FIG. 4). In this case, the second intermediate body can be cut at the second region having neither carbon layer 42 nor the conductive polymer layer formed, so that carbon layer 42 and the conductive polymer layer are unlikely to be damaged by the cutting of the second intermediate body. This results in enabling a positive electrode having excellent reliability to be manufactured efficiently and continuously.

In the present exemplary embodiment, the lead member has been attached. When it is unnecessary to attach the lead member, however, the first region may be provided in place of second region 41b, without providing second region 41b.

Modification of Second Exemplary Embodiment

Figure 5:
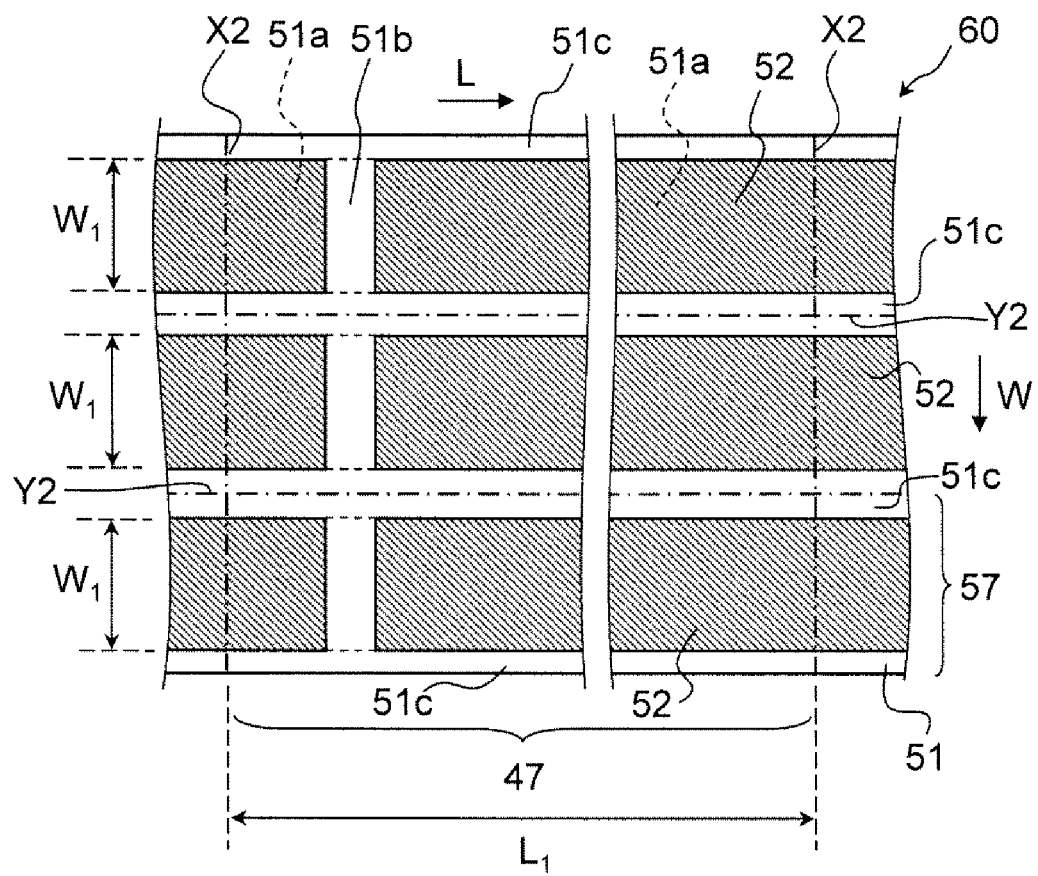
FIG. 5 is a top view illustrating first intermediate body 60 obtained by a method for manufacturing a positive electrode for a power storage device according to a modification of the second exemplary embodiment of the present disclosure.

In place of first intermediate body 50 of the present exemplary embodiment, first intermediate body 60 may be prepared that is shown in FIG. 5 and includes three unit regions 57 repetitively formed along direction W of positive current collector 51. One unit region 57 in first intermediate body 60 corresponds to one first intermediate body 50. In FIG. 5, hatched area is a region (first region 51a) having carbon layer 52 formed. In addition to second region 51b having no carbon layer 52, first intermediate body 60 has second region 51c having no carbon layer 52 not only on widthwise both ends (in direction W in FIG. 5) but also between adjacent unit regions 57 along direction L. A second intermediate body produced by performing an electropolymerization step on first intermediate body 60 is cut along cutting line X2 that is shown as a dot-and-dash line X2 in FIG. 5 and further cut along cutting line Y2 that is shown as a dot-and-dash line Y2 in FIG. 5 so as to be separated into each of unit regions 47 and 57. Thus it is possible to obtain a same structure as the second intermediate body of the present exemplary embodiment. In the same manner as in the first exemplary embodiment, a lead member can be attached, along direction W of positive current collector 51, to second region 51b having neither carbon layer 52 nor the conductive polymer layer formed.

In the present modification, second region 51c has been formed between adjacent unit regions 57 along direction L. The second region, however, is not necessarily formed between adjacent unit regions 57.

In the present modification, first intermediate body 60 has been prepared. First intermediate body 60 includes three unit regions 57 repetitively formed along direction W of positive current collector 51. A number of repeated unit regions 57, however, is not limited to three.

[Method for Manufacturing Power Storage Device]

A method for manufacturing a power storage device according to the present disclosure includes the steps of: manufacturing a positive electrode by the method for manufacturing a positive electrode for a power storage device (step (A)); and stacking or winding the positive electrode, a negative electrode, and a separator, the separator being interposed between the positive electrode and the negative electrode (step (B)). The step (B) forms a stacked or wound electrode group.

The step (A) includes the steps (1) and (2) described above.

The step (A) preferably further includes a step of attaching a lead member to a surface of the second region of the positive current collector in the second intermediate body produced by the step (2). Since the surface of the second region in the second intermediate body produced by the step (2) is not exposed by the process of scraping described above, a clean, smooth, and flat surface of the second region is retained. Hence, the lead member can be sufficiently adhered and firmly attached to a predetermined surface of the second region. Accordingly, it is unlikely to occur that the lead member falls off the positive electrode, due to vibration generated, for example, during conveyance of a power storage device, to cause the power storage device not to operate. And it is also unlikely to occur that contact resistance between the lead member and the positive electrode increases by a failure of connection between the lead member and the positive electrode so that internal resistance of a power storage device increases.

The negative electrode used in the step (B) includes, for example, a negative current collector and a negative electrode material layer.

As the negative current collector, a conductive sheet material is used, for example. Examples of the sheet material, include a metal foil, a metal porous body, a punched metal, and an etched metal. As a material for the negative current collector, it is possible to use, for example, copper, a copper alloy, nickel, and stainless steel.

The negative electrode material layer preferably contains, as a negative electrode active material, a material that electrochemically stores and releases lithium ions. Examples of such a material include a carbon material, a metal compound, an alloy, and a ceramic material. As the carbon material, graphite, non-graphitizable carbon (hard carbon), and easily graphitizable carbon (soft carbon) are preferable, and graphite and hard carbon are particularly preferable. Examples of the metal compound include silicon oxide and tin oxide. Examples of the alloy include a silicon alloy and a tin alloy. Examples of the ceramic material include lithium titanate and lithium manganate. These materials may be used alone or in combination of two or more of these materials. Among these materials, a carbon material is preferable in terms of being capable of achieving low potential of the negative electrode.

The negative electrode material layer preferably contains, for example, a conducting agent and a binder besides the negative electrode active material. Examples of the conducting agent include carbon black and a carbon fiber. Examples of the binder include a fluorine resin, an acrylic resin, a rubber material, and a cellulose derivative. Examples of the fluorine resin include polyvinylidene fluoride, polytetrafluoroethylene, and a tetrafluoroethylene-hexafluoropropylene copolymer. Examples of the acrylic resin include polyacrylic acid and an acrylic acid-methacrylic acid copolymer.

Examples of the rubber material include a styrene-butadiene rubber, and examples of the cellulose derivative include carboxymethyl cellulose.

The negative electrode material layer is formed by, for example, preparing a negative electrode mixture paste that contains a mixture of a negative electrode active material, a conducting agent, a binder, and the like with a dispersion medium and applying the negative electrode mixture paste to the negative current collector, followed by drying. For the dispersion medium, water or N-methyl-2-pyrrolidone (NMP) is preferably used, for example. Subsequently, a coating film is desirably pressed between rollers in order to enhance strength of the negative electrode material layer.

The negative electrode is preferably pre-doped with lithium ions in advance. This lowers potential of the negative electrode to increase a difference in potential between the positive electrode and the negative electrode (that is, voltage) and thus improve energy density of a power storage device.

Pre-doping of the negative electrode with lithium ions is advanced by, for example, forming a metal lithium film that serves as a supply source of lithium ions on a surface of the negative electrode material layer and impregnating the negative electrode having the metal lithium film with a nonaqueous electrolytic solution having lithium ion conductivity. At this time, lithium ions are eluted from the metal lithium film into the nonaqueous electrolytic solution and the eluted lithium ions are stored in the negative electrode active material. For example, when graphite or hard carbon is used as the negative electrode active material, lithium ions are inserted in between layers of graphite or in fine pores of hard carbon. An amount of lithium ions to be pre-doped can be controlled by a mass of the metal lithium film.

A method for forming the metal lithium film on the surface of the negative electrode material layer may be a method of bonding the metal lithium foil to the negative electrode material layer or may be a method of depositing a lithium film on the surface of the negative electrode material layer according to a vapor phase method. The vapor phase method is, for example, a method with use of a vacuum deposition apparatus, and a thin film of metal lithium can be formed by evaporating metal lithium in equipment in which a high degree of vacuum is kept and depositing metal lithium on the surface of the negative electrode material layer.

A step of pre-doping the negative electrode with lithium ions may be performed before assembling the electrode group, or pre-doping may be advanced after the electrode group is housed together with the nonaqueous electrolytic solution in a case of a power storage device. In the latter case, the electrode group may be prepared after the metal lithium film is formed on the surface of the negative electrode in advance.

As the separator used in the step (B), a nonwoven fabric made of cellulose fiber, a nonwoven fabric made of glass fiber, a microporous membrane made of polyolefin, a fabric cloth, and a nonwoven fabric are preferably used. The separator has a thickness ranging, for example, from 10 μm to 300 μm, inclusive, preferably from 10 μm to 40 μm, inclusive.

The method for manufacturing a power storage device according to the present disclosure preferably further includes a step of soaking the electrode group with a nonaqueous electrolytic solution.

The nonaqueous electrolytic solution has lithium ion conductivity and contains a lithium salt and a nonaqueous solvent that dissolves the lithium salt. At this time, a salt containing an anion is used as the lithium salt to make it possible to reversibly repeat doping and dedoping of the anion in and from the positive electrode. On the other hand, lithium ions derived from the lithium salt are stored in the negative electrode.

Examples of the lithium salt include $LiClO_4$, $LiBF_4$, $LiPF_6$, $LiAlCl_4$, $LiSbF_6$, LiSCN, $LiCF_3SO_3$, $LiFSO_3$, $LiCF_3CO_2$, $LiAsF_6$, $LiB_{10}Cl_{10}$, LiCl, LiBr, LiI, $LiBCl_4$, $LiN(FSO_2)_2$, and $LiN(CF_3SO_2)_2$. These lithium salts may be used alone or in combination of two or more of these lithium salts. Among these lithium salts, desirably used is at least one selected from the group consisting of a lithium salt having a halogen atom-containing oxo acid anion suitable for a second anion, and a lithium salt having an imide anion. Concentration of the lithium salt in the nonaqueous electrolytic solution may range, for example, from 0.2 mol/L, to 4 mol/L, inclusive, and is not particularly limited.

Examples of the nonaqueous solvent that can be used include cyclic carbonates such as ethylene carbonate, propylene carbonate, and butylene carbonate; chain carbonates such as dimethyl carbonate, diethyl carbonate, and ethyl methyl carbonate; aliphatic carboxylate esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethylsulfoxide, 1,3-dioxolane, formamide, acetamide, dimethylformamide, dioxolane, acetonitrile, propionitrile, nitromethane, ethyhnonoglyme, trimethoxymethane, sulfolane, methyl sulfolane, and 1,3-propanesultone. These nonaqueous solvents may lie used alone or in combination of two or more of these nonaqueous solvents.

The nonaqueous electrolytic solution may be prepared by adding an additive to the nonaqueous solvent as necessary. For example, an unsaturated carbonate such as vinylene carbonate, vinyl ethylene carbonate, or divinyl ethylene carbonate may be added as an additive for forming a coating having high lithium ion conductivity on the surface of the negative electrode.

Hereinafter, one example of the method for manufacturing a power storage device according to the present disclosure is described with reference to FIGS. 6 and 7. The method for manufacturing a power storage device according to the present disclosure, however, is not limited to this example.

First, as shown in FIG. 2, second intermediate body 40 is obtained that includes first region 31a having conductive polymer layer 33 formed selectively on a surface of carbon layer 32 and a second region 31b having a surface of positive current collector 31 exposed (steps (1a) and (2a)). Next, as shown in FIG. 3, lead tab 15A of a lead member is connected to second region 31b of second intermediate body 40 (step (3a)). Thus, positive electrode 21 is prepared to which the lead member has been attached.

Figure 7:
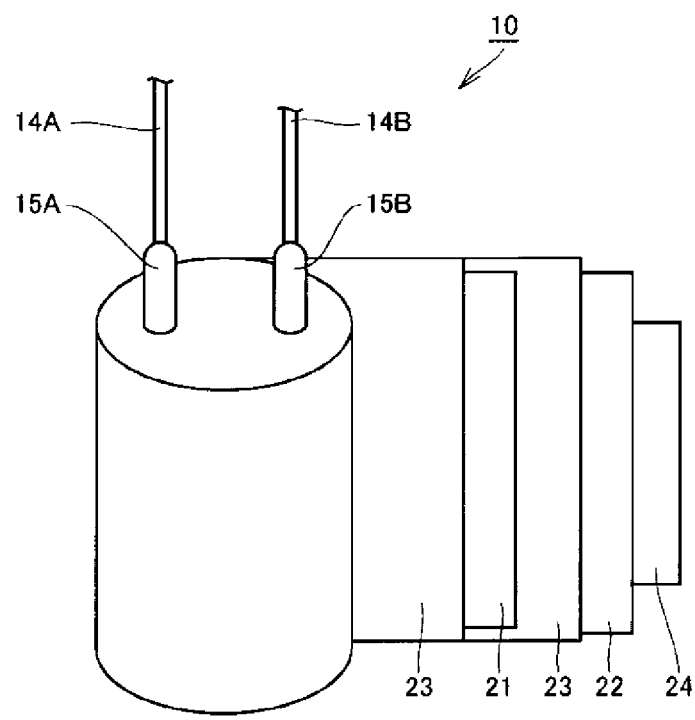
FIG. 7 is a schematic view for illustrating a configuration of the power storage device shown in FIG. 6.

Next, positive electrode 21 to which the lead member (lead wire 14A and lead tab 15A) has been connected, negative electrode 22 to which a lead member (lead wire 14B and lead tab 15B) has been connected, and separator 23 are wound with the separator interposed between the positive electrode and the negative electrode to give, as shown in FIG. 7, electrode group 10 that has the lead members exposed from one end surface of the electrode group (step (B)). An outermost periphery of electrode group 10 is fixed with fastening tape 24.

Figure 6:
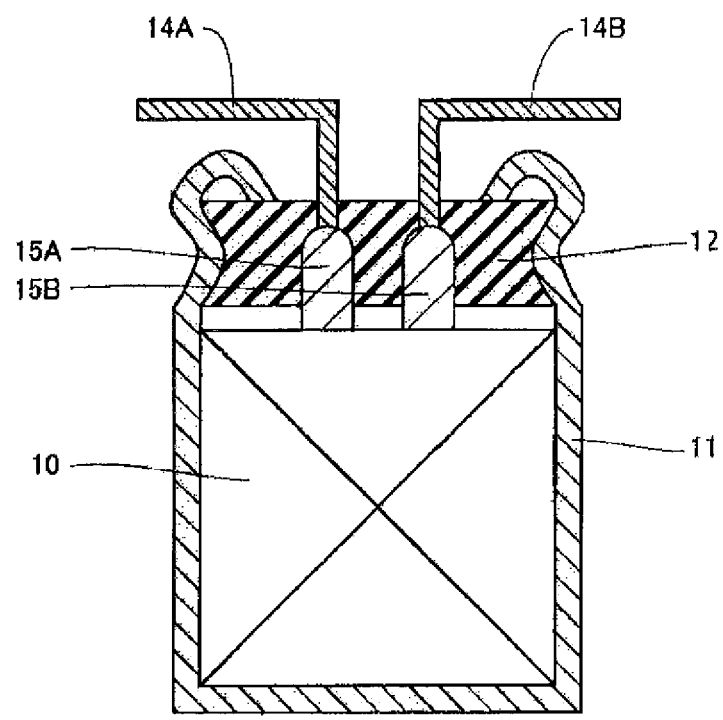
FIG. 6 is a schematic sectional view illustrating one example of a power storage device obtained by a method for manufacturing a power storage device according to the present disclosure.

As shown in FIG. 6, electrode group 10 is housed together with a nonaqueous electrolytic solution (not shown) in bottomed cylindrical container 11 having an opening. Lead wires 14A, 14B are led out from sealing body 12. Sealing body 12 is disposed in the opening of container 11 to seal container 11. More specifically, container 11 is, at a part near an opening end, processed inward by drawing, and is, at the opening end, curled to swage sealing body 12. Sealing body 12 is formed of, for example, an elastic material containing a rubber component.

In the exemplary embodiment, a wound cylinder-shaped power storage device has been described. An application range of the present disclosure, however, is not limited to the example described above, and the present disclosure can also be applied to a square-shaped or stacked power storage device.

A power storage device produced by a method for manufacturing a power storage device according to the present disclosure can be suitably used for application where required capacitance is higher than capacitance of an electric double layer capacitor or a lithium ion capacitor and required output is higher than output of a lithium ion secondary battery.

What is claimed is:

1. A method for manufacturing a positive electrode for a power storage device, the method comprising:
preparing a current collector having a sheet-shape, the current collector having a front surface and a back surface that is opposite to the front surface,
forming a carbon layer on a first region of the front surface while no carbon layer is formed in a second region of the front surface; and
forming a conductive polymer on the carbon layer by immersing the current collector in an electrolytic solution containing a raw material monomer of the conductive polymer and then conducting electrolytic polymerization of the raw material monomer.

2. The method according to claim 1, wherein:
the second region extends across in a widthwise direction of the current collector and extends in at least one position in a lengthwise direction of the current collector.

3. The method according to claim 1, wherein:
the current collector includes a base material made of at least one of aluminum or an aluminum alloy, and
the conductive polymer includes at least one of polyaniline or a derivative of polyaniline.

4. The method according to claim 1, wherein:
the second region extends in a lengthwise direction of the current collector.

5. The method according to claim 4, wherein:
the current collector includes a base material made of at least one of aluminum or an aluminum alloy, and
the conductive polymer includes at least one of polyaniline or a derivative of polyaniline.

6. The method according to claim 1, further comprising attaching a lead member to the second region in which no carbon layer is present.

7. The method according to claim 6, wherein:
the current collector includes a base material made of at least one of aluminum or an aluminum alloy, and
the conductive polymer includes at least one of polyaniline or a derivative of polyaniline.

8. The method according to claim 6, wherein:
the second region extends across in a widthwise direction of the current collector and extends in at least one position in a lengthwise direction of the current collector.

9. The method according to claim 8, wherein:
the current collector includes a base material made of at least one of aluminum or an aluminum alloy, and
the conductive polymer includes at least one of polyaniline or a derivative of polyaniline.

10. A method for manufacturing a power storage device, the method comprising:
forming a positive electrode by the method according to claim 1; and
stacking or winding the positive electrode, a negative electrode, and a separator, the separator being interposed between the positive electrode and the negative electrode.

11. A method for manufacturing a positive electrode for a power storage device, the method comprising:
preparing a current collector having a sheet-shape, the current collector having a front surface and a back surface that is opposite to the front surface,
forming a carbon layer in a first region of the front surface while no carbon layer is formed in a second region of the front surface; and
forming a conductive polymer on the carbon layer by immersing the current collector in an electrolytic solution containing a raw material monomer of the conductive polymer and then conducting electrolytic polymerization of the raw material monomer, while no conductive polymer is formed on the second region.

12. The method according to claim 11, wherein:
the second region extends across in a widthwise direction of the current collector and extends in at least one position in a lengthwise direction of the current collector.

13. The method according to claim 11, wherein:
the current collector includes a base material made of at least one of aluminum or an aluminum alloy, and
the conductive polymer includes at least one of polyaniline or a derivative of polyaniline.

14. The method according to claim 11, wherein:
the second region extends in a lengthwise direction of the current collector.

15. The method according to claim 14, wherein:
the current collector includes a base material made of at least one of aluminum or an aluminum alloy, and
the conductive polymer includes at least one of polyaniline or a derivative of polyaniline.

16. The method according to claim 11, further comprising attaching a lead member to the second region in which no carbon layer and no conductive polymer are present.

17. The method according to claim 16, wherein:
the current collector includes a base material made of at least one of aluminum or an aluminum alloy, and
the conductive polymer includes at least one of polyaniline or a derivative of polyaniline.

18. The method according to claim 16, wherein:
the second region extends across in a widthwise direction of the current collector and extends in at least one position in a lengthwise direction of the current collector.

19. The method according to claim 18, wherein:
the current collector includes a base material made of at least one of aluminum or an aluminum alloy, and
the conductive polymer includes at least one of polyaniline or a derivative of polyaniline.

20. A method for manufacturing a power storage device, comprising:
forming a positive electrode by the method according to claim 11; and stacking or winding the positive electrode, a negative electrode, and a separator, the separator being interposed between the positive electrode and the negative electrode.

* * * * *